United States Patent [19]

Attaway et al.

[11] E Re. 28,870

[45] Reissued June 22, 1976

[54] COPING STRUCTURE

[75] Inventors: Julian J. Attaway; Randolph W. Driggers, both of Tucker, Ga.

[73] Assignee: MM Systems Corporation, Tucker, Ga.

[22] Filed: Aug. 20, 1975

[21] Appl. No.: 606,088

Related U.S. Patent Documents

Reissue of:

[64] Patent No.: 3,862,531
Issued: Jan. 28, 1975
Appl. No.: 395,277
Filed: Sept. 7, 1973

[52] U.S. Cl. ..... 52/300; 52/58
[51] Int. Cl.[2] ..... E04F 19/02
[58] Field of Search ..... 52/300, 58

[56] References Cited

UNITED STATES PATENTS

| | | | |
|---|---|---|---|
| 2,959,259 | 11/1960 | Meyer | 52/718 |
| 3,270,474 | 9/1966 | Driggers | 52/718 X |
| 3,512,326 | 5/1970 | Greene | 52/300 X |
| 3,802,140 | 4/1974 | Arkman | 52/96 X |

*Primary Examiner*—Ernest R. Purser
*Assistant Examiner*—Carl D. Friedman
*Attorney, Agent, or Firm*—John B. Armentrout

[57] ABSTRACT

A coping structure is provided wherein a splice joint between a pair of normally inverted channel-like coping members is had through use of a splice member which cooperates inside the channels of the pair of coping members for covering a transverse seam between adjacent longitudinal ends of the coping members, the splice member [ web furthermore being biased to seam covering position by resilient means interposed between the splice member web and the web of a saddle, the saddle having legs engaging legs of the pair of coping members and ] being *supported and biased upwardly to cover the seam, and front and rear legs of the coping members being engaged, against upward movement, with means* secured to a wall supporting the coping structure.

19 Claims, 9 Drawing Figures

Fig. 1
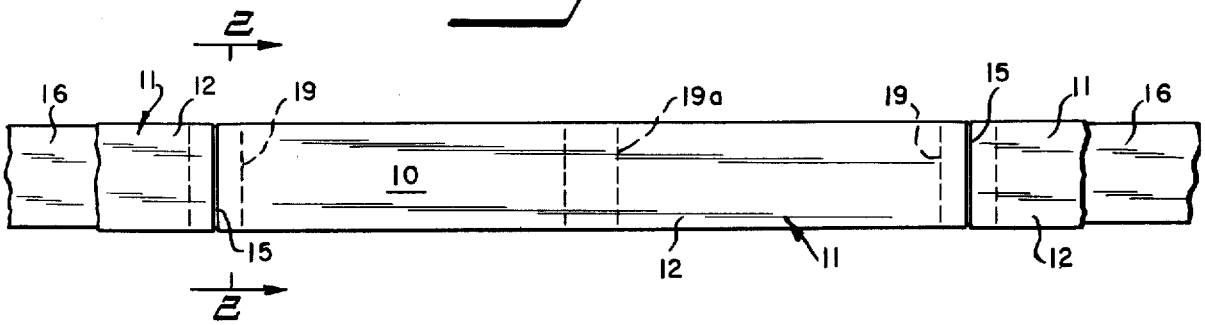
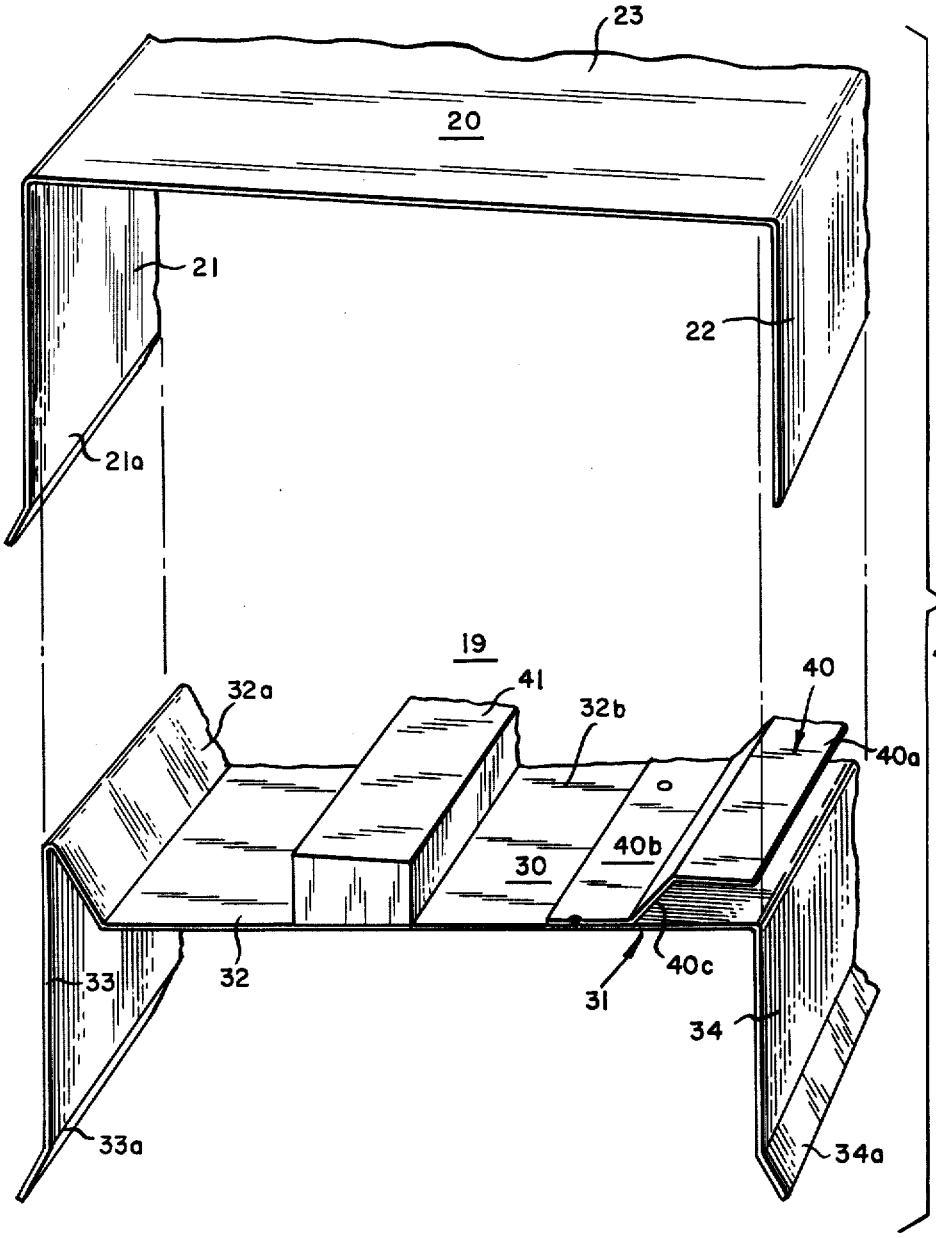
Fig. 3

COPING STRUCTURE

Matter enclosed in heavy brackets [ ] appears in the original patent but forms no part of this reissue specification; matter printed in italics indicates the additions made by reissue.

The present invention relates to coping structure for covering the opposite upper side facial areas and top of a wall, and is more particularly concerned with coping structure wherein a plurality of coping members are utilized for capping a wall longitudinally in series with one another.

*This invention interrelates a pair of inverted channel-like coping members which cap a wall, with splice and support means, for the splice and support means to support the pair of coping members while splicing the pair of coping members across a transverse seam formed by contiguous longitudinal end portions of the pair of coping members. First and second legs of each of the pair of coping members are interconnected by a web and have engagable means thereon. The splice and support means comprises, splice means disposed inside the pair of coping members and against the webs of the pair of coping members from substantially the first legs of the pair of coping members to the second legs of the pair of coping members and splicing the pair of coping members across the transverse seam, and support means connected with the wall and engaging the engagable means on the several legs of the pair of coping members against upward movement of the pair of coping members and rigidly obstructing downward movement of the splice means and the webs of the pair of coping members and disengagement of the engagable means on the first legs of the pair of coping members. Further, the splice and support means includes biasing means biasing the splice means against the webs of the pair of coping members to support the pair of coping members resiliently against downward movement of the pair of coping members and against disengagement of the engagable means on the second legs of the pair of coping members while the engagable means on the several legs of the pair of coping members are engaged against upward movement of the pair of coping members.*

An object of this invention *accordingly* is to achieve a coping splice joint involving adjacent longitudinal ends of a normally inverted channel-like pair of coping members and entailing use of a splice member inside the channels of the pair of coping members, along with having splice support structure connected with the legs of the pair of coping members and mounted on a wall, and using resilient biasing means acting against the splice member for urging the splice member upwardly against the pair of coping members.

Another object herein is to achieve coping splice joint structure of the character indicated, and to support at least one of the pair of coping members through use of a contact member disposed inside the channel of the coping member intermediately of the opposite longitudinal ends of the coping member, through having structure supporting the contact member and connected with the legs of the coping member and mounted on the wall, this with introducing resilient biasing means in the coping for urging the contact member upwardly against the coping member.

Other objects of this invention in part will be obvious and in part pointed out more fully hereinafter.

In accordance with the present invention a coping structure for capping a wall is provided including a pair of channel-like coping members having contiguous longitudinal end portions which form a transverse seam with one another. A web of each of the pair of coping members is disposed over the top of a wall which thus is covered, and front and rear legs of each of the two coping members lead from the web of the related coping member and are adjacent to the wall so as to cover upper facial areas of front and rear sides of the wall respectively. The front leg of each of the pair of coping members is characterized by having a flange to be engaged for restraining the coping member against upward movement forwardly in the coping structure and the rear leg of each of the two coping members comprises an end portion to be engaged at least against upward movement of the coping member rearwardly in the coping structure.

In splice and support means provided in the coping structure, a splice member includes front and rear legs and a web interconnecting the latter legs, for the splice member to be disposed inside the channels of the pair of coping members and the splice member legs and web *to be* located across the aforementioned transverse seam and in overlap with the legs and webs of the pair of coping members. Further, in the splice and support means, a splice support structure adapted to be secured to the wall is characterized by including a web and front and rear legs depending from the web of the splice support structure so as, when installed, to have the front and rear legs and web of the splice support structure interposed between front and rear upper facial areas *and top* of the wall and the front and rear legs and web of the splice member. The front leg of the splice support structure has an end portion for engaging the front leg flanges of the pair of coping members, and arresting upward movement of the pair of coping members, and the rear leg of the splice support structure has an end portion for being engaged with the rear leg end portions of a pair of coping members. A further feature resides in that the web of the splice support structure includes a raised forward web portion for sustaining the splice member web contiguous to the webs of the pair of coping members forwardly in the coping structure and for impeding the pair of coping members forwardly against downward movement while the flanges of the front legs of the pair of coping members and the front leg end portion of the splice support structure are engaged to arrest upward movement of the pair of coping members. The web of the splice support structure also is characterized by having a lower rearward portion adjacent to the top of the wall.

The splice and support means further includes resilient biasing means extending deflected between the web of the splice support structure and the splice member web for urging the splice member upwardly against the webs of the pair of coping members at least rearwardly of the forward raised web portion of the splice support structure while the front leg flanges of the pair of coping members engage the front leg end portion of the splice support structure and the rear leg end portions of the pair of coping members are engaged at least against upward movement of the pair of coping members rearwardly in the coping structure.

Should there be need, a similar additional normally inverted channel-like coping member is introduced to the remaining opposite end of either of the pair of coping members already described, thus to form a further transverse seam and prolong the coping structure longitudinally. Of course, as need may be, a plurality of such coping members may be introduced, as for example by adding those coping members to produce transverse seams at both remaining opposite ends of the aforementioned pair of coping members. Each transverse seam accordingly formed is accompanied by a corresponding splice and support means similar to that already described, the thus added splice and support means being installed upon the then appropriate upper portion of the wall and so as to be underneath the two particular coping members which form the given transverse seam.

Another feature in accordance with the present invention resides in the provision of contact and support means wherein a contact member and related support structure are provided inside the channel of a normally inverted channel-like coping member of the character hereinbefore described, the contact and support means being adapted to be installed upon a portion of the wall so as to be underneath the coping member intermediately of the opposite longitudinal ends of the coping member. The support structure referred to includes a web and front and rear legs depending from the latter web, and as installed is securely on the wall. The front leg of the contact support structure has an end portion for engaging the front leg flange of the coping member and arresting upward movement of the coping member forwardly in the coping structure, and the rear leg of the contact support structure has an end portion for being engaged with the rear leg of the coping member for at least arresting upward movement of the coping member rearwardly in the coping structure. A raised forward portion of the web of the contact support structure is provided for impeding downward movement of the coping member while the front leg flange of the coping member and the front leg end portion of the contact support structure are engaged for arresting upward movement of the coping member. The contact support structure further is characterized by the web thereof having a lower rearward portion adjacent to the top of the wall, and the contact and support means furthermore includes resilient biasing means extending deflected between the web of the contact support structure and the contact member web for urging the contact member upwardly against the coping member web at least rearwardly of the forward raised web portion of the contact support structure while the front leg flange of the coping member engages the front leg end portion of the contact support structure and the rear leg end portion of the coping member and the rear leg end portion of the contact support structure are engaged at least against upward movement of the coping member rearwardly in the coping structure.

The accompanying drawings include selected views in illustration, and not limitation, of preferred embodiments of the present invention, in which:

FIG. 1 is a top plan view representing a coping structure installed on a wall;

Figure 2:
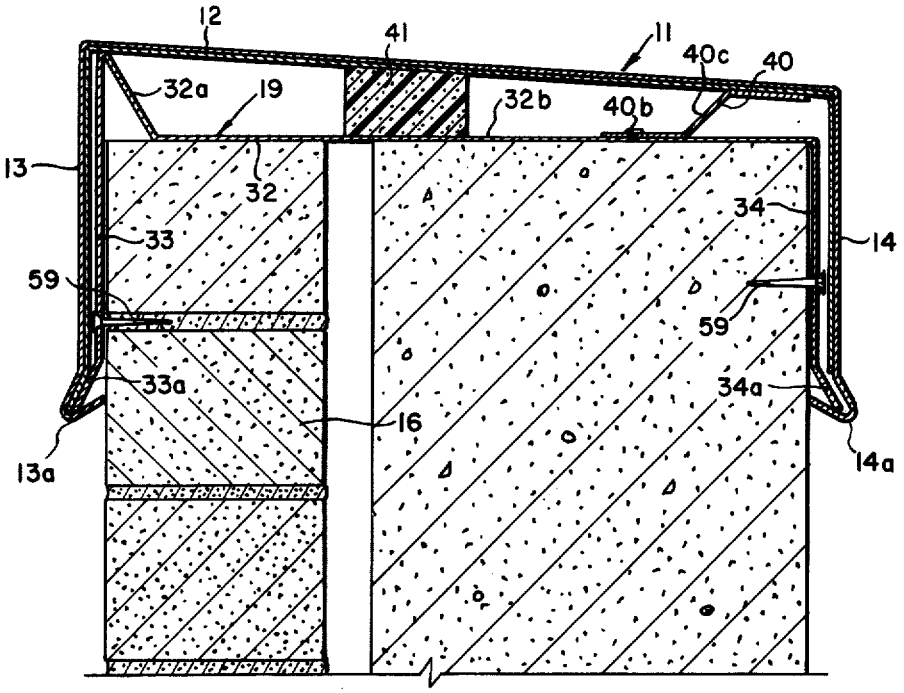
FIG. 2 is a transverse cross section taken in a vertical plane inclusive of line 2—2 in FIG. 1.
Figure 8:
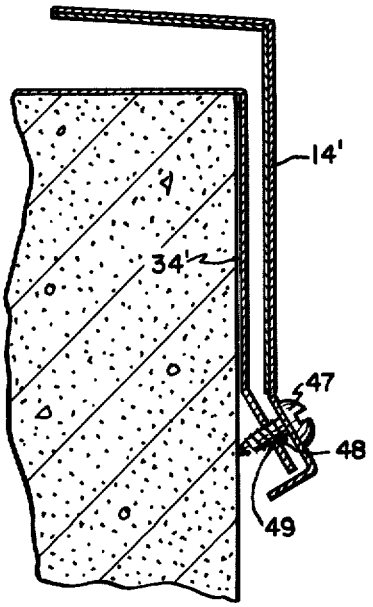
Figure 9:
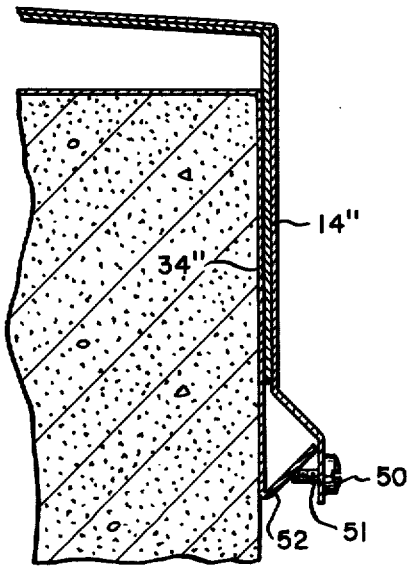

FIG. 3 provides a detail representation of a splice member, and of splice support and biasing structure, and corresponds to FIG. 1;

FIGS. 4, 5, 6 and 7 represent modified embodiments of coping structure and are transverse cross sections comparable with FIG. 2; and FIGS. 8 and 9 are broken away detail transverse cross sectional views representing modified connections effected between rear legs of coping members and rear legs of splice support structure.

Referring now more particularly to FIGS. 1 and 2 herein, a coping structure 10, represented installed upon a wall 16, such as a parapet, includes a plurality of channel-like members 11, which are similar in cross section, each comprising a web 12 which interconnects a front leg 13 and a rear leg 14 of the coping member. Adjacent longitudinal ends of the coping members 11 form transverse seams 15 with one another in the installation, the member webs 12 being disposed covering the top of the wall 16 and the front and rear legs 13 and 14 of the members being located forwardly and rearwardly outside upper side facial areas of the wall 16, respectively. The front and rear legs 13 and 14 of each related coping member 11 introduce upwardly and inwardly open doubled lower end portions 13a and 14a which form downwardly and outwardly directed flanges for the coping member to be engaged in a manner hereinafter to be described.

In the present embodiment and in the several other embodiments chosen to be represented in the accompanying drawings, the coping members referred to are preferably made from aluminum alloy sheet material though of course if desired the coping members may instead be produced from some other sheet material such as galvanized sheet steel or be formed as extrusions or molded products of any suitable composition.

At the transverse seams 15, the coping members 11 are connected with the wall 16 and are spliced. Accordingly, each such connection and splice joint includes splice and support means 19 comprising a splice member 20 and splice support structure 30 which are represented in detail in FIG. 3. The splice support structure 30 comprises a wall saddle member 31 provided with a web 32 and front and rear legs 33 and 34. A raised forward portion 32a of the saddle member web 32 is integral with the upper end of front leg 33 and leads downwardly and rearwardly and is integral with a lower rearward portion 32b of the saddle member web *thus to contribute rigidity to the front leg 33 through bracing the same*, the lower rearward portion of the latter web being integral with the upper end of rear leg 34. Lower outwardly and downwardly directed flange end portions 33a and 34a of the front and rear legs 33 and 34 are introduced for engaging the front and rear flanges 13a and 14a of the coping members 11 thus to arrest upward and in fact downward movement of the coping members on the wall 16.

A plurality of the splice and support means 19, all of which are similar, are spaced apart from one another longitudinally of the wall 16 so as individually to underlie the adjacent ends of the coping members 11 at the transverse seams 15. In these positions, the wall saddle members 31 have their webs 32 bridging across the top of the wall 16 from front to rear, and the front and rear legs 33 and 34 of the saddle members are respectively outside front and rear upper facial areas of the wall 16, meanwhile having the raised forward portions 32a of the webs 32, and the upper ends of the front legs 33, projecting above the top of the wall, and the lower rearward portion 32b of the webs 32 furthermore resting against the top of the wall. The wall saddle members 31 accordingly positioned are secured to the wall 16 as by headed fasteners 59 introduced through appropriate apertures in the wall saddle member legs and into the wall 16 or the saddle members are secured as by use of a bonding material adhering each saddle member to the wall, this with or without the use of headed fasteners.

Splice member 20 in each of the splice and support means 19 is configurated to nest into the channel of any one or another of the coping members 11 and includes front and rear legs 21 and 22 integral with web 23 which interconnects the upper ends of those legs. As installed in adjacent ends of a pair of coping members 11, web 23 of the splice member overlaps the webs 12 of the pair of coping members at the underneath side of the coping members while leading across the related transverse seam 15, this with also having the front and rear legs 21 and 22 overlap the front and rear legs 13 and 14 of the pair of coping members while extending across the related transverse seam 15. A downwardly and outwardly directed lower end flange 21a of the splice member leg 21 is entrant into the inwardly and upwardly open flanges 13a of the related pair of channel members 11 so as in this manner to have the web 23 lie substantially against the webs 12 of the two channel members at the front. Rear leg 22 of the splice member is a straight leg throughout, and terminates at lower end slightly above the inwardly and upwardly open flanges 14a of the related pair of channel members 11 when the splice member 23 is brought up against the webs 12 of the two channel members at the rear.

In the present embodiment, the splice members 20 and the wall saddle members 31 are made from galvanized sheet steel and by cutting and bending into form, though of course any other suitable material or forming operations may instead be resorted to if desired.

In installing any particular one of the similar splice members 20 across the related seam 15, the splice member legs 21 and 22 advantageously are initially sprung apart so as thereafter upon insertion of the splice member into the channels of the pair of coping members 11 the legs 21 and 22 inherently exert pressure upon the legs 13 and 14 of the two channel members, thus closing against the seam 15 from the inside.

Describing further the similar splice seat structures 30, and by referring to but one such splice seat structure 30, which is thought to suffice, a spring strip 40 of galvanized sheet steel, or of any other suitable resilient material, has a rearwardly directed upper flange 40a and a forwardly directed lower flange 40b leading outwardly from opposite sides of a normally rearwardly inclined intermediate connecting strut 40c of the strip. The spring strip 40 is situated in the margin defined on the lower web portion 32b of the related wall saddle member 31 from the rear leg 34 of the wall saddle member, and the lower flange 40b is spot welded to the lower web portion 32b in order to have the intermediate strut 40c and the upper flange 40a resiliently project from the [ wall ] *web of* saddle member 31. A block of neoprene 41 or of other suitable resilient material, adhered to the lower web portion 32b of the wall saddle member 31, is situated between the forward raised portion 32a of the saddle member web 32 and the spring strip 40 and coextends longitudinally of the wall with the spring strip 40 and the supporting wall saddle member web.

With regard to any particular one of the splice seat structures 30 securely on the wall 16 as hereinbefore described, a pair of the coping members 11 forming a transverse seam 15 at their adjacent longitudinal ends outside the wall saddle member 31 of the splice seat structure 30 have their front leg end flanges 13a engaging the front leg flange end portion 33a of the wall saddle member 31 and accordingly are arrested forwardly in the coping structure 10 against upward movement, while downward movement in order to release the front leg end flanges 13a of the pair of coping members from the front leg flange end portion 33a of the wall saddle member is impeded forwardly in the coping structure 10 by the raised forward web portion 32a of the saddle member web and the resilient block 41. Meanwhile, with the rear leg end flanges 14a of the pair of coping members 11 engaging the rear leg flange end portion 34a of the wall saddle member 31 against upward movement of the two coping members, the splice member web 23 is thrust upwardly against the webs 12 of the two coping members under bias of the spring strip 40 and the resilient block 41. Further, in the present embodiment, it will be understood that the plurality of splice and support means 19 [ are ] *for* the coping members 11 used in the coping structure 10 are proportioned so that when the wall saddle members 31 are properly installed on the wall 16 and the front and rear leg end flanges 13a and 14a are engaged with the corresponding front and rear leg flange end portions 33a and 34a of the wall saddle members 31, the webs 12 of the coping members 11 slope rearwardly and downwardly in the coping structure while the webs 23 of the splice members 20 are supported on bias of the spring strips 40 and the resilient blocks 41 on the wall saddle members 31 up against the coping member webs 12 and across the transverse seams 15. If desired, each seam 15 is sealed off by the addition of a caulking compound or of any other suitable sealant between the related splice member 20 and the corresponding end portions of the coping members 11 in the joint. In certain embodiments still in accordance with the present invention the upper end of the resilient block 41 and the upper flange 40a of the resilient strip 40 may instead be affixed to the web of the splice member 20 thus to have a lower free end of the resilient block and a lower free flange of the strip press upon the saddle member web 32 for biasing the splice member upwardly into contact with the coping members 11 at the seam 15.

As need may be in the present embodiment, support and connection with the wall 16 of any particular one of the coping members 11, intermediately of the opposite longitudinal ends of the coping member, is for example had through use of one or more of the splice and support means 19 hereinbefore described, but installed on the wall and connected with the coping member 11 intermediately of the opposite longitudinal ends of the coping member so as to have the associated splice member 20 removed longitudinally of the coping member from any of the transverse seams 15 and serve merely as an intermediate contact or shim member against the web 12 of the coping member within the coping member channel. One such installation is designated as 19a in FIG. 1 and in transverse cross section is similar to FIG. 2 except for the fact that the installation is removed longitudinally of the coping member 11 from either of the transverse seams 15 at the opposite longitudinal ends of the coping member.

Figure 4:
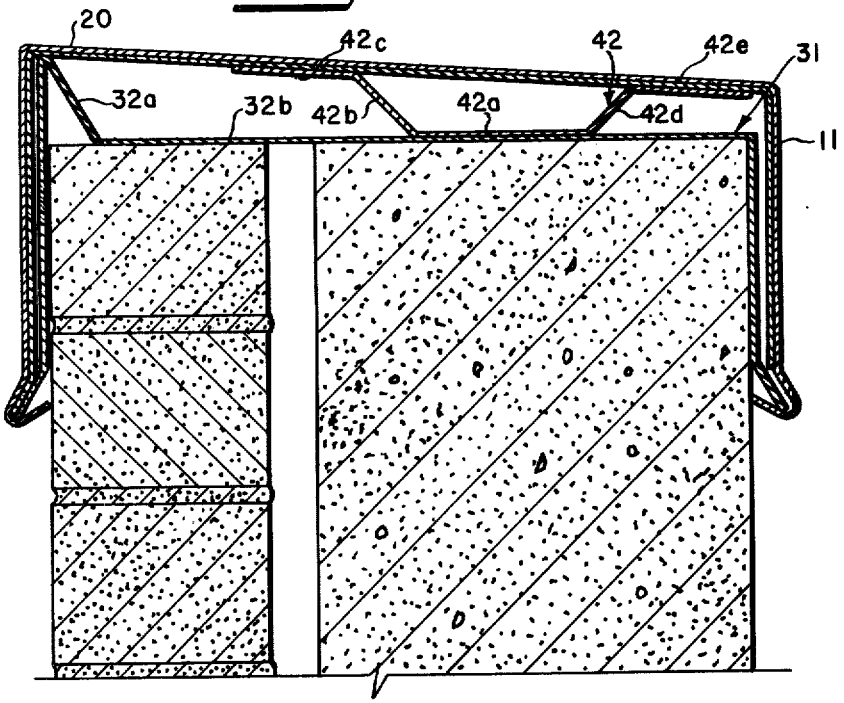
Figure 5:
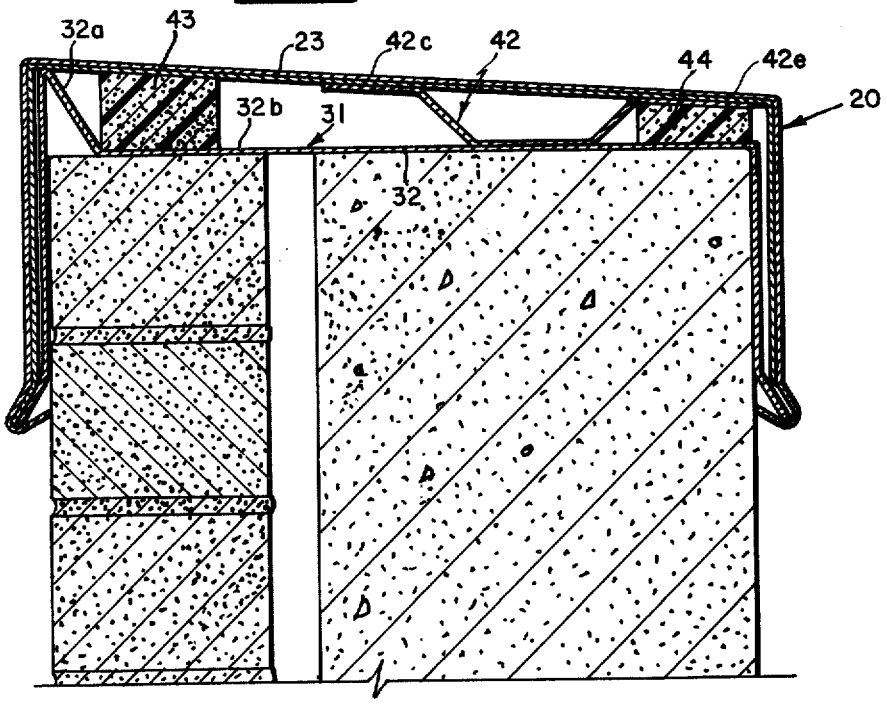

In the FIG. 4 embodiment of the present invention, the coping structure as hereinbefore described is modified to the extent that each of the wall saddle members 31 carries a biasing means which comprises a spring strip 42, such as of galvanized steel sheet, the spring strip furthermore including a base 42a which is spot welded to the lower web portion 32b of the saddle member, a forwardly inclined strut 42b integral with a forward flange 42c leading toward the forward raised portion 32a of the saddle member web, and a rearwardly inclined strut 42d integral with a rearward flange 42e leading rearwardly in the saddle member. The forward and rearward flanges 42c and 42e serve as presser feet in contact with the related splice or contact member 20 for the spring strip 42 to raise the related splice or intermediate contact member 20 into contact with one or more of the coping members 11 depending upon whether the particular saddle member 31 is installed intermediately of the longitudinal ends of one of the coping members 11 or is used for bridging across a transverse seam between two of the coping members 11. In certain embodiments in accordance with the present invention, the spring strips 42 disclosed as the biasing means used in connection with the wall saddle members 31 are supplemented by pairs of blocks 43 and 44 (see FIG. 5) such as of neoprene or of other suitable resilient material. Typically, in this respect, block 43 is securely based upon the lower web portion 32b of the related saddle member 31 so as to be between the forward raised portion 32a of the web 32 and the forward flange 42c of the spring strip 42, and block 44 is securely based upon this same lower web portion 32b and projects into contact with the underneath side of the rearward flange 42e of the spring strip 42. The two blocks 43 and 44 have their upper ends in contact with the web 23 of the related splice or intermediate contact member 20 and are held compressed while the flanges 42c and 42e of the spring strip 42 are also in contact with the web 23 and are held deflected, so as to bias the splice or intermediate contact member 20 upwardly against the web 12 of the coping member or members 11 with which the wall saddle member 31 is associated in the coping structure.

Figure 6:
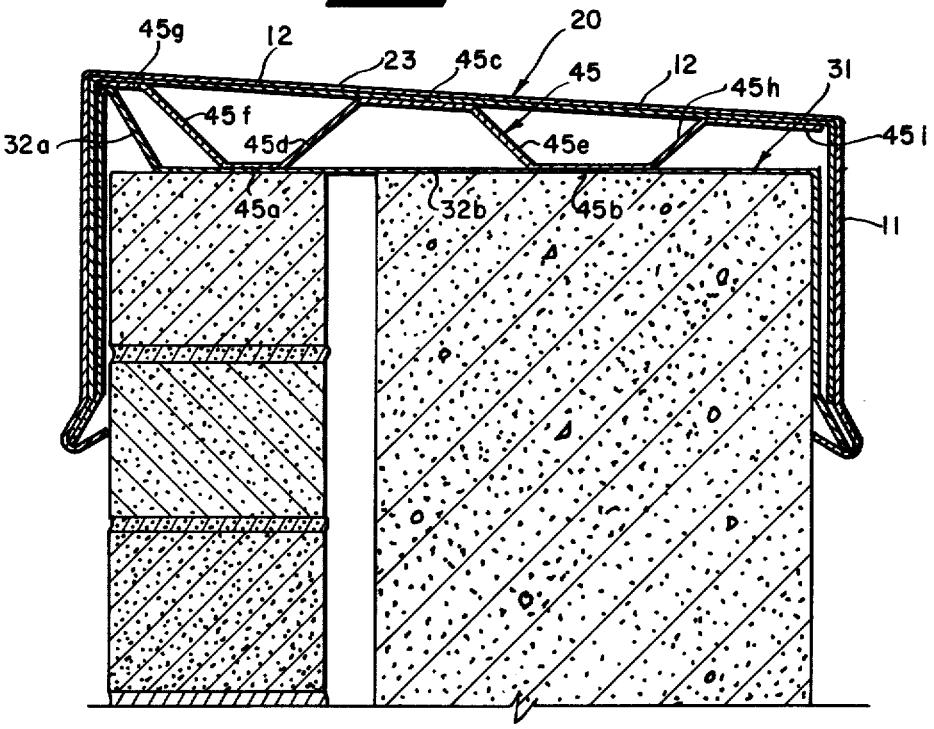

In FIG. 6, the embodiment therein represented introduces a truss detail along with biasing means afforded on the wall saddle members 31. Thus, a spring strip 45 of galvanized sheet steel or of other suitable material includes a pair of bases 45a and 45b which respectively are spaced apart [ in ] *and* forward and rearward bases 45a and 45b are interconnected by an intermediate rearwardly and downwardly sloping top truss component 45c and by oppositely downwardly and outwardly inclined side truss components 45d and 45e respectively leading from the forward end of the top truss component 45c to the rearward end of the forward base 45a and from the rearward end of the top truss component 45c to the forward end of the rearward base 45b, the top truss component 45c serving as a rest for the web of the related splice or intermediate contact member 20 and being directly under the rearwardly and downwardly sloping web 12 of either the pair of coping members 11 or the one of the coping members 11 utilized in connection with the saddle member as hereinbefore described. The biasing means in the spring strip 45 includes a forward strut 45f leading forwardly and upwardly inclined from the forward end of base 45a, and a forward flange 45g integral with the upper end of the strut 45f and projecting over the upper end of the raised forward web portion 32a of the wall saddle member 31, and the biasing means in the spring strip 45 further includes a rearward strut 45h leading rearwardly and upwardly inclined from the rearward end of base 45b, and a rearward flange 45i integral with the upper end of the strut 45h and projecting rearwardly above the lower web portion 32b of the wall saddle member 31. The flanges 45g and 45i prior to being installed in the coping structure are sprung upwardly along with the struts 45f and 45h from the bases 45a and 45b so as to be deflected to the positions indicated in FIG. 6 through being installed in the coping structure and thus to bias the web 23 of the associated splice or intermediate contact member 20 upwardly against the web structure of either the coping member 11 or the pair of coping members 11 involved in the connection.

Figure 7:
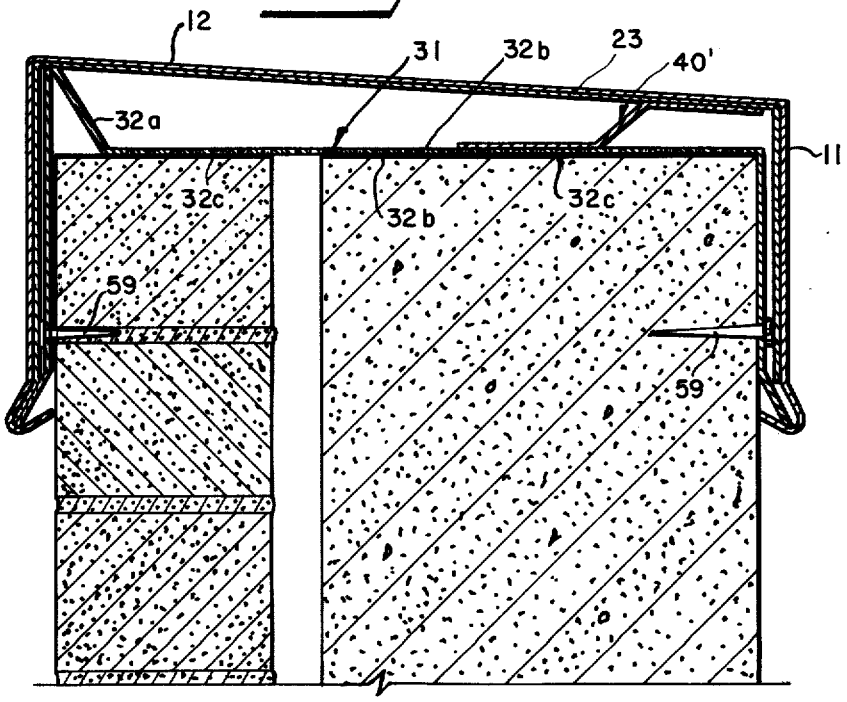

In a further embodiment, represented in FIG. 7, the coping structure is similar to that of FIGS. 1 to 3, inclusive, but involves the introduction of a network of apertures 32c in the lower web portion 32b of the wall saddle members 31 in order to have a cementing agent introduced between the lower web portion 32b and the top of a wall on which the coping structure is installed ooze through the apertures 32c and thus achieve improved bond. Optionally, of course, headed fasteners 59 may be used with or without the cementing agent for fastening the saddle member to the wall and the same comment applies to the other embodiments disclosed herein. It will also be observed that in the FIG. 7 embodiment a spring strip 40' of the character described with reference to FIGS. 1 to 3 is utilized secured in a rearward position on the lower web portion 32b for biasing the rearward portion of the splice or intermediate contact member web 23 upwardly against the web or webs 12 of the coping member or members 11 in the connection, reliance meanwhile being placed upon the upper end of the raised forward portion 32a of the saddle member 31 for maintaining contiguity of the forward portion of the splice or intermediate contact member web 20 to the web or webs 12 of the coping member or members 11 in the connection.

In certain embodiments in accordance with the present invention, screws are utilized for securing lower end portions of the rear legs of the coping members to lower end portions of the wall saddle members, such as in FIG. 8 wherein each screw 47 has its shank through apertures 48 and 49 respectively in a lower end portion of the coping member rear leg 14' and in a lower end portion of the wall saddle member rear leg 34' and threadedly engaged in the apertures with those portions, or such for example as in FIG. 9 wherein each screw 50 has its shank engaged with the coping member rear leg 14'' through an aperture 51 in a lower end portion of the coping member rear leg and its shank latchedly engaging a lower end latch portion 52 of the wall saddle member rear leg 34''.

As the invention lends itself to many possible embodiments and as many possible changes may be made in the embodiments [ and as many possible changes may be made in the embodiments ] hereinbefore set forth, it will be distinctly understood that all matter described herein is to be interpreted as illustrative and not as a limitation.

We claim:

1. In a coping structure for capping a wall, the combination which includes; a pair of inverted channel-like coping members having contiguous longitudinal end portions forming a transverse seam and said pair of coping members each comprising a web disposed over the top of said wall, and front and rear legs projecting from said web and extending adjacent to said wall outside front and rear sides of said wall respectively, said front and rear legs of each of said pair of coping members including portions to be engaged for restraining said coping member at least against upward movement forwardly and rearwardly in said coping structure; and splice and first support means, said means including a splice member comprising front and rear legs and a web interconnecting said splice member legs, said splice member legs and web being across said seam and in overlap with said legs and webs of said pair of coping members inside the channels of said pair of coping members, and splice support structure securely on said wall and including a web and front and rear legs interconnected by said web of said splice support structure, said front and rear legs and web of said splice support structure being disposed intermediately of said wall and said front and rear legs and web of said splice member, said front leg of said splice support structure having a portion to be engaged with said front leg portions of said pair of coping members for arresting at least upward movement of said pair of coping members, and said rear leg of said splice support structure having a portion for being engaged with said rear leg portions of said pair of coping members for arresting at least upward movement of said pair of coping members, said splice support structure web comprising a raised forward web portion supported by said front leg of said splice support structure for said splice support structure to sustain said splice member web while said splice member web is contiguous to said webs of said pair of coping members forwardly in said coping structure and impede said pair of coping members forwardly against downward movement, having said pair of coping members arrested at least against upward movement through said portions of said front legs of said pair of coping members and said front leg portion of said splice support structure being engaged, and said splice support structure further being characterized by said web thereof having a lower rearward portion adjacent to the top of said wall, and said splice and first support means further including resilient biasing means extending deflected intermediately of said web of said splice support structure and said splice member web for supporting said splice member web while said splice member web is against said webs of said pair of coping members at least rearwardly of said forward raised web portion of said splice support structure and said front leg portions of said pair of coping members are engaged with said front leg portion of said splice support structure at least against upward movement of said pair of coping members forwardly in said coping structure and said rear leg portions of said pair of coping members and said rear leg portion of said splice support structure are engaged at least against upward movement of said pair of coping members rearwardly in said coping structure.

2. In a coping structure as set forth in claim 1 wherein said webs of said pair of coping members slope rearwardly downwardly in the coping structure, having said front leg portions of said pair of coping members engaged with said front leg end portion of said splice support structure and said rear leg portions of said pair of coping members and said rear leg portion of said splice support structure engaged.

3. In a coping structure as set forth in claim 1 wherein said biasing means of said splice support structure includes strip spring means interposed between said lower rearward portion of said splice support structure web and said splice member web and deflected for supporting said splice member web while said splice member web is against said webs of said pair of coping members and said front leg portions of said pair of coping members are engaged with said front leg portion of said splice support structure and said rear leg portions of said pair of coping members and said rear leg portion of said splice support structure are engaged.

4. In a coping structure as set forth in claim 3 wherein said strip spring means includes an inclined strut, and a presser foot extending from said strut, said strut being connected with said web of either said splice member and said splice support structure and sprung having said presser foot contacting the other said web of said splice member and said splice support structure, for supporting said splice member web while said splice member web is against said webs of said pair of coping members and said leg portions of said pair of coping members are engaged with said leg portions of said splice support structure.

5. In a coping structure as set forth in claim 3 wherein said strip spring means includes a pair of oppositely inclined struts, and presser feet extending from said struts, said struts being connected with said web of either said splice member and said splice support structure and sprung having said presser feet contacting the other said web of said splice member and said splice support structure, for supporting said splice member web while said splice member web is against said webs of said pair of coping members and said leg portions of said pair of coping members are engaged with said leg portions of said splice support structure.

6. In a coping structure as set forth in claim 3 wherein said strip spring means includes a pair of oppositely inclined struts, a base member interconnecting said struts, and presser feet extending from said struts, said base member being connected with said web of either said splice member and said splice support structure and sprung having said presser feet contacting the other said web of said splice member and said splice support structure, for supporting said splice member web while said splice member web is against said webs of said pair of coping members and said leg portions of said pair of coping members are engaged with said leg portions of said splice support structure.

7. In a coping structure as set forth in claim 1 wherein said biasing means includes resilient block means interposed between said lower web portion of said splice support structure and said splice member web and compressed for supporting said splice member web while said splice member web is against said webs of said pair of coping members and said front leg portion of said pair of coping members are engaged with said front leg portion of said splice support structure and said rear leg portions of said pair of coping members and said rear leg portion of said splice support structure are engaged.

8. In a coping structure as set forth in claim 1 wherein screws, having shanks through apertures in said rear leg portions of said pair of coping members and said rear leg portion of said splice support structure, interconnect said rear legs of said pair of coping members with said rear leg of said splice support structure.

9. In a coping structure as set forth in claim 1 wherein said biasing means includes resilient block means, and strip spring means comprising an inclined strut and a presser foot extending from said strut, said strut being connected with said web of either said splice member and said splice support structure and sprung having said presser foot contacting the other said web of said splice member and splice support structure, and said biasing means having said resilient block means disposed compressed behind said presser foot for biasing said presser foot to support said splice member web while said splice member web is against said webs of said pair of coping members and said leg portions of said pair of coping members are engaged with said leg portions of said splice support structure.

10. In a coping structure as set forth in claim 1 wherein said rear leg portion of said splice support structure is adapted to be latchedly engaged, and screws, having shanks through apertures in said rear leg portions of said pair of coping members and said shanks threadedly engaging said pair of coping members in said apertures, engage said rear leg portion of said splice support structure latchedly against upward movement of said pair of coping members rearwardly in said coping structure.

11. In a coping structure as set forth in claim 1 wherein there is further included contact and second support means, the latter said means comprising, contact means extending adjacent to said web of a first of said pair of coping members inside the channel of said first coping member and spaced longitudinally of said first coping member away from opposite longitudinal ends of said first coping member, and contact support structure securely on said wall and including a web and front and rear legs interconnected by said web of said contact support structure, said front leg of said contact support structure having a portion for being engaged with said front leg portion of said first coping member for restraining said first coping member at least against upward movement forwardly in said coping structure, and said rear leg of said contact support structure having a portion to be engaged with said rear leg portion of said first coping member for restraining said first coping member at least against upward movement rearwardly in said coping structure, said contact support structure web comprising a raised forward web portion supported by said front leg of said contact support structure to sustain said contact means while said contact means is contiguous to said web of said first coping member forwardly in said coping structure and impede said first coping member forwardly in the coping structure against downward movement, having said first coping member arrested at least against upward movement through said front portion of said first coping member and said front leg portion of said contact support structure being engaged, and said contact support structure further being characterized by said web thereof having a lower rearward portion adjacent to the top of said wall, and said contact and second support means further including resilient biasing means extending deflected intermediately of said web of said contact support structure and said contact member for supporting said contact means rearwardly of said forward raised web portion of said contact support structure against said web of said first coping member while said front leg portion of said first coping member is engaged with said front leg portion of said contact support structure and said rear leg portion of said first coping member and said rear leg portion of said contact support structure are engaged.

12. In a coping structure for capping a wall, the combination which includes; a pair of inverted channel-like coping members having contiguous longitudinal end portions forming a transverse seam and said pair of coping members each comprising a web disposed over the top of said wall, and front and rear legs projecting from said web and extending adjacent to said wall outside front and rear sides of said wall respectively and said legs including portions to be engaged for restraining said coping member at least against upward movement; and splice and first support means, said means including, a splice member comprising frOnt and rear sheet material legs and a sheet material web integral with said splice member legs, said splice member legs and web being across said seam and in overlap with said legs and webs of said pair of coping members inside the channels of said pair of coping members, and splice support structure securely on said wall and including a sheet material web and sheet material front and rear legs integral with said web of said splice support structure, said front and rear legs and web of said splice support structure being disposed intermediately of said wall and said front and rear legs and web of said splice member and having portions to be engaged with said leg portions of said pair of coping members for arresting at least upward movement of said pair of coping members, said splice support structure web comprising a forward raised web portion supported by said front leg of said splice support structure for said splice support structure to sustain said splice member forwardly in said coping structure in contiguity to said webs of said pair of coping members and impede said pair of coping members forwardly against downward movement, having said pair of coping members arrested at least against upward movement through said front leg portions of said pair of coping members being engaged with said front leg portion of said splice support structure, and said splice support structure further being characterized by said web thereof having a lower rearward portion adjacent to the top of said wall, and said splice and first support means further includlng resilient biasing means extending deflected intermediately of said web of said splice support structure and said splice member web for urging said splice member web upwardly against said webs of said pair of coping members at least rearwardly of said forward raised web portion of said splice support structure while said leg portions of said splice support structure are engaged with said leg portions of said pair of coping members and restrain said pair of coping members at least against upward movement.

13. In a coping structure as set forth in claim 12 wherein said webs of said pair of coping members slope rearwardly downwardly in the coping structure, having said front leg portions of said pair of coping members engaged with said front leg portion of said splice support structure and said rear leg portions of said pair of coping members and said rear leg portion of said splice support structure engaged.

14. In a coping structure as set forth in claim 13 wherein said biasing means includes strip spring means including an inclined strut interposed between said lower rearward portion of said splice support structure web and said splice member web and deflected for supporting said splice member web while said splice member web is against said webs of said coping members and said front leg portions of said coping members are engaged with said front leg portion of said splice support structure and said rear leg portions of said coping members and said rear leg portion of said splice support structure are engaged.

15. In a coping structure as set forth in claim 13 wherein said biasing means includes resilient block means contacting said lower portion of said splice support structure web and said splice member web and compressed for supporting said splice member web while said splice member web is against said web of said coping members and said front leg portions of said coping members are engaged with said front leg portion of said splice support structure and said rear leg portions of said coping members and said rear leg portion of said splice support structure are engaged.

*16. In coping structure for capping a wall, the combination which includes; a pair of inverted channel-like coping members having contiguous longitudinal end portions forming a transverse seam, and said pair of coping members each comprising, a web disposed over the top of said wall, and first and second legs connected with said web and extending adjacent to opposite sides of said wall respectively, said first and second legs of each of said pair of coping members having engagable means thereon; and splice and support means splicing and supporting said pair of coping members, said splice and support means comprising, splice means disposed inside said pair of coping members and upwardly against said webs of said pair of coping members and splicing said pair of coping members across said transverse seam, support means connected with said wall and including, first leg and engaging means comprising sheet material first leg means and first engaging means, and said support means further including, upwardly raised sheet material means leading from against the top of said wall and connected with said sheet material first leg means, and second engaging means, said first and second engaging means of said support means engaging said engagable means on said first and second legs respectively of said pair of coping members against upward movement of said pair of coping members, and said upwardly raised sheet material means rigidly obstructing downward movement of said splice means and said webs of said pair of coping members and disengagement of said engagable means on said first legs of said pair of coping members, and said splice and support means further comprising biasing means biasing said splice means against said webs of said pair of coping members to support said pair of coping members resiliently against downward movement of said pair of coping members and against disengagement of said engagable means on said second legs of said pair of coping members while said engagable means on said legs of said pair of coping members are engaged against upward movement of said pair of coping members.*

*17. In coping structure as set forth in claim 16 wherein said upwardly raised sheet material means and said second engaging means of said support means are interconnected by sheet material resting against the top of said wall.*

*18. In coping structure as set forth in claim 16 wherein said support means includes second leg and engaging means comprising sheet material second leg means having said second engaging means of said support means thereon.*

*19. In coping structure as set forth in claim 18 wherein said upwardly raised sheet material means and said sheet material second leg means of said support means are interconnected by sheet material leading resting against the top of said wall.*

* * * * *